United States Patent Office 3,422,907
Patented Jan. 21, 1969

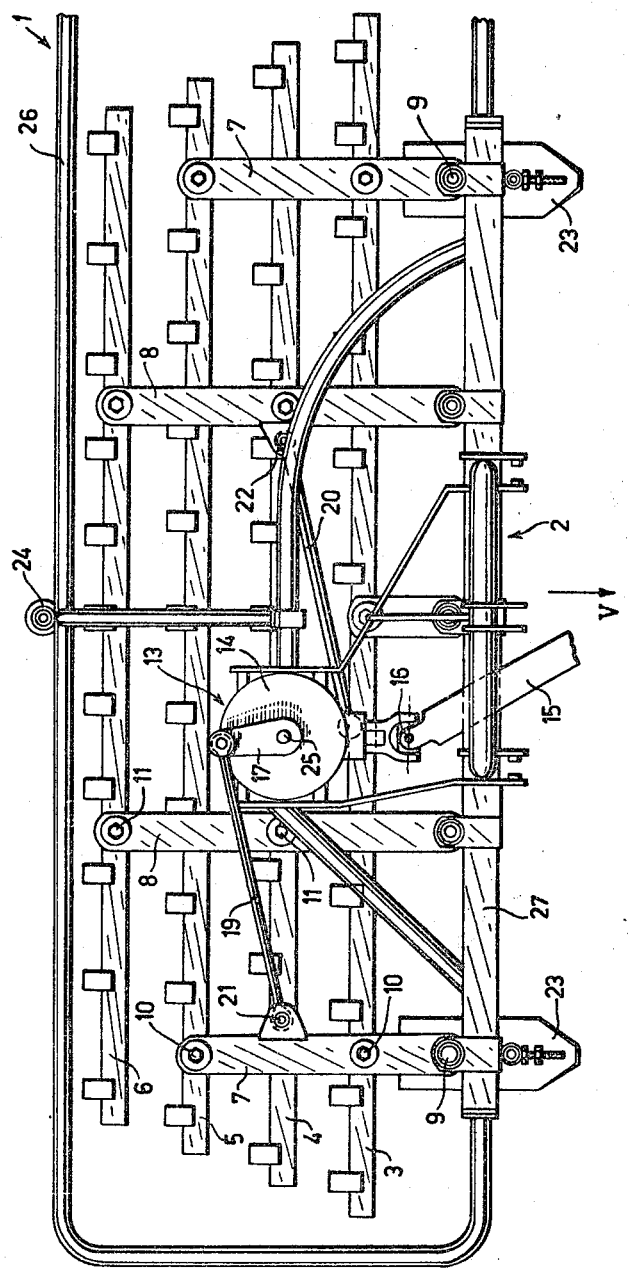

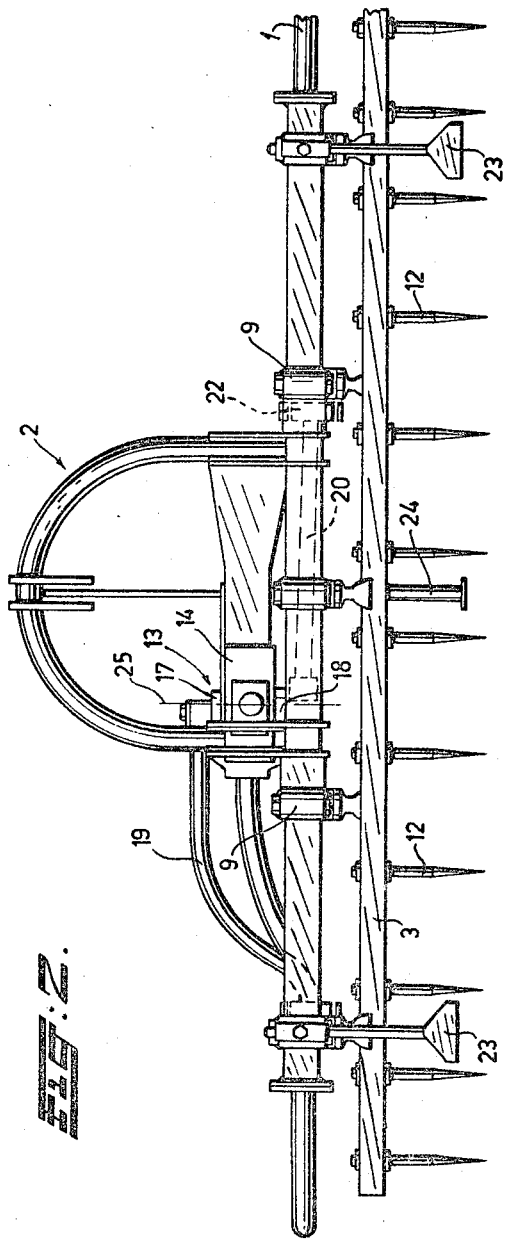

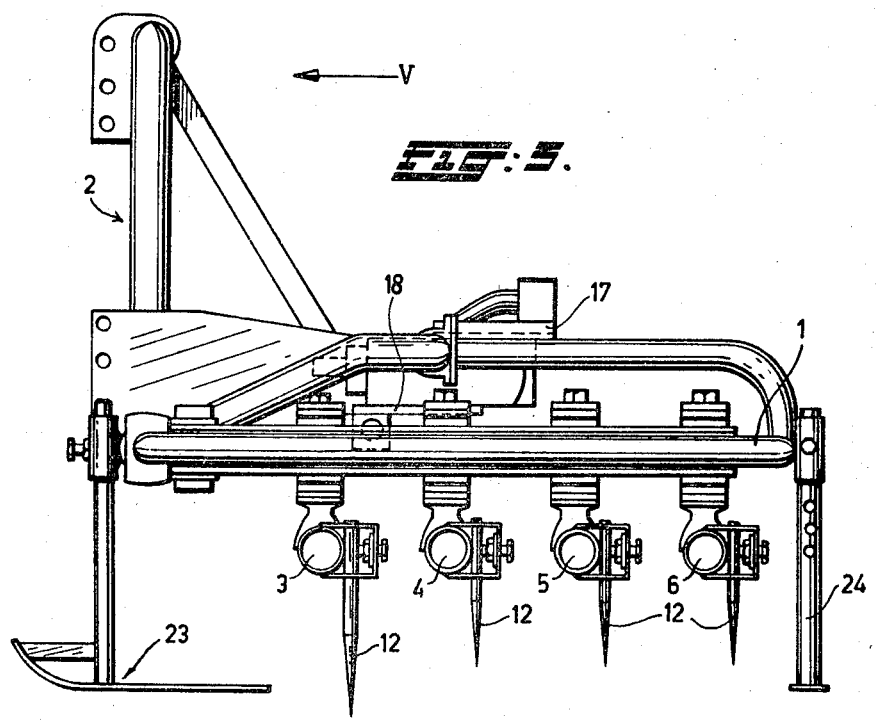
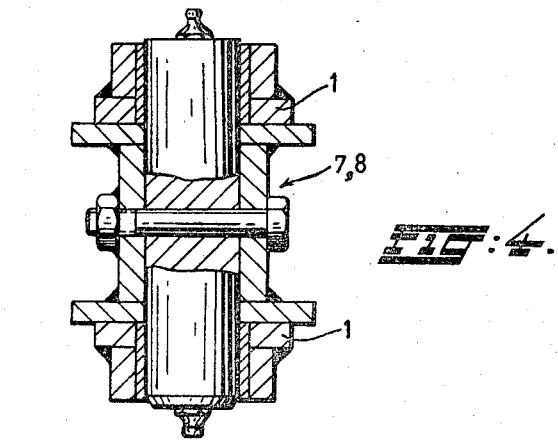

3,422,907
DEVICE FOR HARROWING ARABLE LAND
Joost Gijzenberg, Aalsmeerderweg 933,
Nieuw-Vennep, Netherlands
Filed Nov. 22, 1965, Ser. No. 508,998
Claims priority, application Netherlands, Dec. 3, 1964,
6414018
U.S. Cl. 172—102      3 Claims
Int. Cl. A01b *19/06*

ABSTRACT OF THE DISCLOSURE

Longitudinally spaced and transversely extending harrow beams are mounted by pairs of longitudinally extending arms adapted to oscillate in relatively opposite directions so that the harrow beams traverse substantially coextensive paths. The drive mechanism for the longitudinally extending arms comprises a pair of radial crank arms on a common shaft and projecting in relatively opposite directions therefrom and the cranks being connected by links to individual ones of the pairs of the arms and with the common shaft vertically disposed so as to limit the forces acting on the harrow beams to those contained within horizontal planes.

---

The invention relates to a device for harrowing arable land, which device comprises a plurality of beams, set with teeth and extending in a direction transverse to the normal direction of advance, and a driving mechanism capable of reciprocating the beams in their longitudinal direction. In the known harrows of this type the driving mechanism is always vertically positioned, that is to say perpendicular to the plane in which the harrow beams move to and fro.

These known constructions are disadvantageous in that the angle whereat the constantly varying forces of the to and fro movement act upon the various pivots changes periodically, and as a consequence these pivots are strained. This is a source of disturbances and gives rise to rapid wear and tear in the generally rough branches of agriculture and horticulture. These disadvantages can partially be obviated when ball joints are applied but this increases the cost price of the device, while furthermore a careful maintenance is required therefor.

It is an object of the invention to avoid these disadvantages by providing a structure which allows for the application of simply constructed pivots and hinges. This object is attained according to the invention by positioning the various parts of the driving mechanism such that same move substantially in a plane which is parallel to the plane through the harrow beams. Due to this feature the reaction forces produced in the pivots are substantially situated in a horizontal plane that is to say in a plane which is perpendicular to their rotational axis. Due to the invention no components of force can occur in a vertical direction.

It is a further object of the invention to avoid disturbing forces in a device provided with two eccentrics spaced at 180° and each being connected with a set of harrow beams via a connecting rod, whilst moreover the driving rods do not hinder one the other.

The invention relates in particular to a device in which each set of harrow beams is mutually coupled via some longitudinal arms, which longitudinal arms are hinged to the front side of the frame, and it is a still further object to impart via said longitudinal arms a different movement (speed and amplitude) to the juxtaposed harrow beams.

It is another object of the invention to promote a smooth running of the harrow.

The foregoing and other objects and advantages of the invention will appear in the description to follow. In the description reference is made to the accompanying drawings, which form a part hereof, and in which there is shown by way of illustration and not of limitation a specific form in which the invention may be embodied.

In the drawings:
FIG. 1 shows a plan view of the device.
FIG. 2 is a front view as contemplated from the end which is coupled to a tractor.
FIG. 3 represents to an enlarged scale a side elevation of the device according to the FIGURES 1 and 2.
FIG. 4 is to an enlarged scale a section representing the construction of a pivot or a hinge as applied at various locations in the harrow.

The harrow comprises a frame 1 of substantially rectangular shape which on its front side 27 to be connected with a tractor (not shown) is provided with a three point hitch 2. Within this frame 1 but in a plane slightly thereunder are disposed four harrow beams 3–6, which are supported by longitudinal arms 7 and 8. These longitudinal arms 7 and 8 are hingedly connected at 9 with the front side of the frame 1. This hinged connection is represented in detail in FIG. 4.

The outer longitudinal arms 7 are shorter than the inner longitudinal arms 8. The longitudinal arms 7 are connected via the hinges 10 with the harrow beams 3 and 5. The longitudinal arms 8 are connected via the hinges 11 with the harrow beams 4 and 6.

Each harrow beams 3–6 extending in a direction transverse to the normal direction of advance (arrow V), is provided with harrow teeths or tines 12 over its entire length and up to the beam ends. The beams 3 and 5 constitute a first set of beams which are supported by the longitudinal arms 7, the beams 4 and 6 constitute a second set which are supported by the longitudinal arms 8.

The harrow is further provided with a driving mechanism 13 for reciprocating the beams 3–6 in their longitudinal direction. This driving mechanism is constituted by a bevel gearing in a box 14 to which is imparted a drive from a coupling shaft 15 and a universal joint 16. The shaft 15 is connected through conventional means with the power take-off of a tractor (not shown). The driving mechanism is further provided with two crank arms 17 and 18 which are spaced at 180°. The upper crank arm 17 is connected via a driving rod 19 with one of the outer arms 7. The lower crank arms 18 is connected via a driving rod 20 with one of the inner longitudinal arms 8. The driving rods 19 and 20 are coupled to said longitudinal arms via a joint 21 and 22 respectively and these hinges are constructed in conformity with the hinge 9 shown in FIG. 4.

For maintaining the harrow at a specific level, there are provided two shoes 23 mounted on the front side of the frame 1, an additional foot 24 being disposed in the proximity of the rear side 26, this foot, however, is only used when the harrow is not operative.

The arrangement of the driving mechanism 13 is such that the various parts 17–20 of this mechanism move substantially in a plane which is parallel to the plane through the harrow beams 3–6. The two crank arms 17 and 18 rotate around a common axis 25 which is perpendicular to the said plane and the eccentrics move each in a separate but parallel plane. This axis 25 is situated halfway between a longitudinal arm for the set of harrow beams 3 and 5 and a longitudinal arm for the set of harrow beams 4 and 6 (see FIG. 1).

As will be appreciated from what is disclosed hereinbefore practically only forces situated in a horizontal plane, that is to say in a plane parallel to the plane through the harrow beams 3–6, are produced in the hinges or pivots 9, 21 and 22. There are therefore no disturbing components in a vertical direction, so that the hinges mentioned may be of rather simple construction and need little upkeep. For the hinge 9 this is shown in FIG. 4 and the hinges 21 and 22 are constructed in conformity therewith.

Due to the application of the longitudinal arms 7 and 8 a to and fro movement is imparted to the harrow beams, the amplitude of this movement being smaller for the beam 3 and greater for the beam 6. The length of these beams and their amplitude is such that in operation a rectangular harrowing pattern is obtained of which the width is practically equal to the outer dimensions of the frame 1.

What I claim is:
1. A harrow assembly comprising, in combination:
   an open frame assembly having a forward portion adapted to be attached to a towing vehicle,
   a pair of horizontally disposed, transversely extending harrow beams disposed in parallel, longitudinally spaced relation with said frame,
   a pair of longitudinally extending arms for each of said harrow beams, all of said arms being pivotally mounted to said forward portion of the frame in trailing relationship thereto with one pair of arms being disposed intermediate the other pair of arms,
   a gear assembly mounted on said frame and having a vertical output shaft disposed midway between the pivotal connection between one arm of said one pair of arms and one arm of said other pair of arms, a horizontally disposed input shaft on said gear assembly, said output shaft having a pair of crank arms radially extending therefrom and the crank arms being disposed in relatively opposite direction,
   a link member pivotally connecting one of said crank arms to said one arm of the one pair of arms and a second link member connecting the other crank arm to said one arm of the other pair of arms whereby said one arm are constrained to oscillate through identical arcs but in relatively opposite directions.

2. The harrow assembly as denfined in claim 1 wherein the pivotal connection between said arms and said links are equidistantly spaced from the pivotal connections between said arms and said frame.

3. The harrow assembly according to claim 2 wherein the pivotal connection between said arms and said frame are effected by vertical pins.

References Cited

UNITED STATES PATENTS

| 1,756,820 | 4/1930 | Gaubatz | 172—102 X |
| 3,186,495 | 6/1965 | Gijenberg | 172—102 |

FOREIGN PATENTS

| 859,542 | 12/1952 | Germany. |
| 665,719 | 1/1952 | Great Britain. |

OTHER REFERENCES

Beck: Germany, application No. 1,175,026, July 1964.

ABRAHAM G. STONE, *Primary Examiner.*

W. J. CONLON, *Assistant Examiner.*